United States Patent Office 3,293,293
Patented Dec. 20, 1966

3,293,293
PRODUCTION OF UREAS AND THIOUREAS
Werner F. Dreier, Geneva, Switzerland, and John J. Wise, Arlington, Mass., assignors to Mobil Oil Corporation, a corporation of New York
No Drawing. Filed Apr. 24, 1964, Ser. No. 362,490
22 Claims. (Cl. 260—552)

This invention relates to the production of ureas, thioureas and substituted derivatives thereof, and in particular to a process for producing these ureas in the presence of alumino-silicates having unique catalytic activity.

This invention contemplates a process for producing ureas, thioureas and substituted derivatives thereof in the presence of a catalyst prepared from naturally occurring or synthetic alumino-silicates having active cation sites within an order internal structure. These cation sites are formed by the presence of certain exchangeable metal cations and/or hydrogen ions ionically bonded or chemisorbed within the ordered internal structure of the alumino-silicate; preferably, the cation sites are formed by alkali metal and/or alkaline earth metal cations within the ordered internal structure of the alumino-silicate.

In particular, this invention is directed to a process for producing ureas and thioureas by effecting reaction of ammonia, an amine, or mixtures thereof, with a compound selected from the group consisting of carbon dioxide, carbon disulfide and carbonyl sulfide in a liquid or vapor phase in the presence of the alumino-silicate catalyst.

In accordance with this invention it has been found that ureas, thioureas, and substituted derivatives thereof can be produced by effecting reaction of nitrogen compounds such as ammonia, amines, their substituted derivatives and mixtures thereof, with a compound selected from a group consisting of carbon dioxide, carbon disulfide and carbonyl sulfide in the presence of an alumino-silicate catalyst having exchangeable metal cations and/or hydrogen ions within its ordered internal structure. These exchangeable cations may be present within the catalyst by base exchanging the cations with synthetic or naturally occurring alumino-silicates, by incorporating the cations during the formation of a synthetic alumino-silicate, or by being a part of the naturally occurring alumino-silicate. In general, the unique activity of the alumino-silicate catalyst for effecting the reactions contemplated by this invention is dependent upon the nature and concentration of its active cation sites as well as the accessibility of these sites for contact with the reactants.

The nitrogen compound employed by the process of this invention may be represented by the following general formula:

wherein R and $R_1$ can be the same or different substituents and include hydrogen, alkyl radicals, aryl radicals, cycloalkyl radicals, and the like hydrocarbon substituents. The alkyl radicals may contain from 1 to 18 carbon atoms. Representative of the hydrocarbon substituents are the alkyl radicals such as methyl, ethyl, n-propyl, isopropyl, n-butyl, isobutyl, n-amyl, isoamyl, n-hexyl, n-octyl, n-dodecyl, and the like; aryl radicals such as phenyl, tolyl, xylyls, ethylphenyl, xenyl, naphthyl, ethyl naphthyl, dimethyl naphthyl and the like; and cycloalkyl radicals such as cyclobutyl, cyclopentyl, cyclohexyl, and the like. In addition, other non-interfering groups such as the halo groups (chloro, bromo, fluoro, iodo), alkoxy, carboxy, cyano, and the like, may be attached to the hydrocarbon substituents. Also as exemplified, alkyl groups also may be attached to the aryl moiety.

Among some of the compounds falling within the scope of Formula I are ammonia, methylamine, ethylamine, diethylamine, isobutylamine, cyclohexylamine, aniline, m-toluidine, 2,3-xylidine, mesidine, 1-naphthylamine, diphenylamine, p-chloroaniline, p-methoxyaniline, and the like.

Carbon monoxide, carbon dioxide, carbon disulfide and carbonyl sulfide may be introduced as substantially pure streams or if so desired, together with inert diluents such as nitrogen. Usually carbon dioxide and carbonyl sulfide are introduced as gases at room temperature, whereas carbon disulfide is introduced initially as a liquid.

The ureas, thioureas, and substituted derivatives thereof formed by this invention may be represented by the following formula:

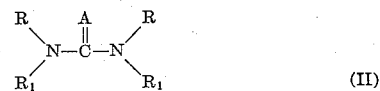

wherein R and $R_1$ represent the substituents previously designated in Formula I above, and A represents either an oxo (=O) or a thio (=S) group. These products include urea, thiourea, methylurea, ethyl thiourea, cyclohexylurea, phenylurea, N,N'-diethylurea, N,N'-dipropylurea, 1-benzyl-2-thiourea, N,N'-diphenylthiourea, N,N'-dibenzylurea, N,N'-bis(4-hydroxy phenyl) thiourea and the like. It will be appreciated in some instances, a mixture of ureas and thioureas may be formed as products; particularly, when carbonyl sulfide is used as a reactant. In addition, water and/or hydrogen sulfide are usually produced as by-products. Furthermore, in some instances, other compounds such as isocyanates, isothiocyanates, azoles, thiazoles and the like may be also produced together with the ureas and thioureas.

In accordance with this invention, several types of alumino-silicate catalysts may be employed to promote the formation of ureas and thioureas. The preferred catalysts have a sparse distribution of hydrogen sites within an ordered internal structure and are prepared from the alkali metal and alkaline earth metal (e.g., sodium, potassium, lithium calcium, barium, strontium, and the like) forms of the synthetic and naturally occurring alumino-silicates, including zeolite A and the faujasites such as zeolites X and Y. (These zeolites are hereinafter described in greater detail.)

In addition, alumino-silicates that contain a high concentration of hydrogen sites within an ordered internal structure may also serve as catalysts. These hydrogen sites are produced by ionically bonding or chemisorbing hydrogen ions within the molecular structure of the alumino-silicate. Such bonding or chemisorption may be effected by base exchange of the alumino-silicate with a fluid medium containing the hydrogen ions; the resulting exchanged product, often acquiring an acid character.

The alumino-silicate catalysts having a high concentration of hydrogen sites may be prepared from a variety of naturally occurring and synthetic alumino-silicates. These alumino-silicates have exchangeable metal cations (e.g. alkali metals and alkaline earth metals) that may be completely or partially replaced by conventional base exchange with certain other metal cations and/or hydrogen ions to produce the desired concentration of hydrogen sites within an ordered internal structure.

Some alumino-silicates can be base exchanged directly with hydrogen ions to form the acid catalysts for this invention; however, other alumino-silicates such as zeolite X, a synthetic faujasite, are not suitable to direct base exchange with hydrogen ions, or are not structurally or thermally stable after a portion of their exchangeable metal cations have been replaced with hydrogen ions. Thus, it is often necessary to exchange other metal cations with these alumino-silicates to achieve the necessary stability within the ordered internal structure prior to the inclusion of the hydrogen ions. In effecting such stability, it has been found that base exchange of certain polyvalent metal cations (such as those of the rare earth metals), not only provides stability to the alumino-silicates, but also increase the concentration of hydrogen sites without the subsequent base exchange of hydrogen ions. Apparently, the bonding of metal cations, particularly those polyvalent cations having higher valences within certain alumino-silicates causes the formation of hydrogen sites within their ordered internal structures. It is believed that such metals, especially those which have valences of three or more, produce hydrogen sites within the alumino-silicate because of the spatial arrangement of the $AlO_4$ and $SiO_4$ tetrahedra which make up the ordered internal structure of the alumino-silicate.

Within certain alumino-silicates, where nearly every other tetrahedron has an exchangeable cation site (usually an alkali metal or alkaline earth metal), a polyvalent cation (two valent and even some three valent cations) may be accommodated within chemical bond distance by two or three, respectively, neighboring cation sites. However, if this accommodation is not spatially feasible, it is believed that the polyvalent metal cation is hydrolyzed thereby reducing its valence by the addition of one (or more, depending on its valence) hydroxy groups $(OH)^-$ and creating from water molecules (present in the alumino-silicate structure) a hydrogen ion (for each $[OH]^-$ group) which then occupies one of the sites vacated by the exchangeable metal cation.

In this manner, those metals having higher valences may provide a higher concentration of hydrogen sites within an alumino-silicate. Thus, the formation of hydrogen sites within an alumino-silicate may occur while base exchanging the metal cations with a naturally occurring or synthetic zeolite or during the formation of a synthetic zeolite in an ionizable medium. Furthermore, the concentration of hydrogen sites created by these metals may be further increased by subsequent base exchange with hydrogen ions or cations which are capable of being converted to hydrogen ions; e.g., the ammonium radical $(NH_4^+)$.

It should be noted that in some instances there is no patent evidence for the presence of the hydrogen ion in the absence of reactant. For instance, some of the catalysts of this invention, when contacted with water, may be found to confer a neutral or even alkaline reaction to the water. In such instances the hydrogen ion is believed to form, under reaction conditions, by dislocation of the alkali metal cation in contact with the reactant and/or traces of impurities such as water and $CO_2$, and the like.

Furthermore, the stability and the distribution of active cation sites formed within an alumino-silicate is also affected by the silicon to aluminum atomic ratio within its ordered internal structure. In an isomorphic series of crystalline alumino-silicates, the substitution of silicon for aluminum in the rigid framework of the lattice results in a decrease of total cation sites as evidenced by elemental analysis and reduction of exchange capacity. Thus, among the faujasite isomorphs, the zeolite known as "Y" will have a sparser distribution of sites within the pores than the zeolite known as "X." It has been found that alumino-silicates having a high silicon to aluminum atomic ratio are more desirable for preparing the acid catalyst of this invention, preferably the silicon to aluminum atomic ratio is at least 1.8. These catalysts are readily treated to contact with solutions which contain hydrogen ions and are readily regenerable, after having been used, by contact at elevated temperatures with an oxygen containing stream under controlled conditions such that the carbonaceous residues may be efficiently removed without damage to the essential structure and properties of the catalyst.

In addition, the unique activity of the alumino-silicate catalysts contemplated by this invention may be continuously activated so as to maintain a high level of activity while on stream. This continual activation is effected by controlling the sparsity of distribution of active acid sites formed within the ordered internal structure of the catalyst. It will be realized that during the present process some degradation and polymerization products may be formed which produce a coke-like material on the alumino-silicate catalyst. The accumulation of this material often causes the catalyst to gradually lose its effective activity by blocking off the active cation sites for contact with the reactants.

However, it has been found that the effects of these undesirable products may be controlled by the introduction of carbon dioxide and other like oxygen-containing compounds into the reactants. It will be appreciated that these activators may be introduced in the charge stream or in separate streams if desired. The activators are particularly effective with alkali metal salts of the alumino-silicate catalysts. In general, the molar ratio between the reactants and the activating materials may range from about 0.001 to about 0.5. It will be appreciated that the selection of a particular activating material as well as its mode of introduction will be dependent upon the catalyst to be activated and the reactants being employed.

It will also be appreciated that the concentration of the hydrogen sites produced either by direct exchange of hydrogen ions or by hydrolysis of exchanged polyvalent metal cations within certain alumino-silicates as described above, may vary according to the cations employed, the degree of base exchange, as well as the aluminosilicate being treated. Accordingly, it has been determined that the alumino-silicates having at least 0.5 milliequivalent of hydrogen per gram of solid and preferably above about 0.75 milliequivalent of hydrogen per gram of solid provide effective acid catalysts for the purposes of this invention. It will be understood that this value indicates the total concentration of hydrogen ions present within an alumino-silicate and that the spatial concentration of these ions is dependent on the ordered internal structure of the specific alumino-silicate being treated.

Because the unique activity of the alumino-silicate catalyst for effecting the present reactions is dependent on the accessability of the active cation sites as well as the nature of the sites, the defined pore size of the aluminosilicate is to be considered when preparing the catalyst of this invention. In general, the alumino-silicate should have a pore size of such dimensions that it can accept the reactants within its ordered internal structure and also allow egress of the resulting products. When using aryl and substituted aryl primary monoamines or the like cyclic compounds as reactants, it may be necessary to have larger pore sizes, i.e. 10 A. to 13 A. in diameter. It will be appreciated that in certain instances aluminosilicates having small pore sizes provide effective catalysts for the production of certain cyclic and acylic compounds because of their particular molecular configurations. Preferably, the pore size of the catalyst is from about 5 A. to about 15 A. in diameter. It will be appreciated that the pore size selected for the alumino-silicate catalyst will depend on the reactants to be employed as well as the configuration of the reaction products that are to be produced.

Typical of the alumino-silicates employed in accordance with this invention, are several alumino-silicates, both natural and synthetic, which have a defined pore size of from 5 A. to 15 A. within an ordered internal structure. These alumino-silicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form, the alumino-silicates may be represented by the formula:

$$M_{2/n}O:Al_2O_3:wSiO_2:yH_2O$$

wherein M is a cation which balances the electrovalence of the tetrahedra, $n$ represents the valence of the cation, $w$ the moles of $SiO_2$, and $y$ the moles of $H_2O$. The cation can be any one or more of a number of metal ions depending on whether the alumino-silicate is synthesized or occurs naturally. Typical cations include sodium, lithium, potassium, calcium, and the like. Although the proportions of inorganic oxides in the silicates and their spatial arrangement may vary, effecting distinct properties in the alumino-silicates, the two main characteristics of these materials are the presence in their molecular structure of at least 0.5 equivalent of an ion of positive valence per gram atom of aluminum, and an ability to undergo dehydration without substantially affecting the $SiO_4$ and $AlO_4$ framework.

One of the crystalline alumino-silicates utilized by the present invention is the synthetic faujasite designated as zeolite X, and is represented in terms of mole ratios of oxides as follows:

$$1.0 \pm 0.2 M_{2/n}O : Al_2O_3 : 2.5 \pm 0.5 SiO_2 : yH_2O$$

wherein M is a cation having a valence of not more than 3, $n$ represents the valence of M, and $y$ is a value up to 8, depending on the identity of M and the degree of hydration of the crystal. The sodium form may be represented in terms of mole ratios of oxides as follows:

$$0.9 Na_2O : Al_2O_3 : 2.5 SiO_2 : 6.1 H_2O$$

Zeolite X is commercially available in both the sodium and the calcium forms.

It will be appreciated that the crystalline structure of zeolite X is different from most zeolites in that it can adsorb molecules with molecular diameters up to about 10 A.; such molecules including branched chain hydrocarbons, cyclic hydrocarbons, and some alkylated cyclic hydrocarbons.

Other alumino-silicates are contemplated as also being effective catalytic materials for the invention. Of these other alumino-silicates, a synthetic faujasite, having the same crystalline structure as zeolite X and designated as zeolite Y has been found to be active. Zeolite Y differs from zeolite X in that it contains more silica and less alumina. Consequently, due to its higher silica content this zeolite has more stability to the hydrogen ion than zeolite X.

Zeolite Y is represented in terms of mole ratios of oxides as follows:

$$0.9 \pm 0.2 Na_2O : Al_2O_3 : WSiO_2 : XH_2O$$

wherein W is a value greater than 3 up to about 5 and X may be a value up to about 9.

The selectivity of zeolite Y for larger molecules is appreciably the same as zeolite X because its pore size extends from 10 A. to 13 A.

Another synthesized crystalline alumino-silicate, designated as zeolite A, has been found to be effective for the purposes of this invention. This zeolite may be represented in mole ratios of oxides as:

$$1.0 \pm 0.2 M_{2/n}O : Al_2O_3 : 1.85 \pm 0.5 SiO_2 : yH_2O$$

wherein M represents a metal, $n$ is the valence of M, and $y$ is any value up to about 6.

The sodium form of this zeolite may be represented by the following formula:

$$Na_{12}(AlO_2)_{12}(SiO_2)_{12} \cdot 27 H_2O$$

This material often designated as a "4A" zeolite, has a pore size of about 4 A. in diameter. When the sodium cations have been substantially replaced with calcium by conventional exchange techniques, the resulting zeolite is designated as a "5A" zeolite and has a defined pore size of about 5 A. in diameter.

Other alumino-silicate materials found to be active in the present process are designated as mordenite and mordenite-like structures. These zeolites have an ordered crystalline structure having a ratio of silicon atoms to aluminum atoms of about 5 to 1. In its natural state mordenite usually occurs as a mixed salt of sodium, calcium and/or potassium. The pure sodium form may be represented by the following formula:

$$Na_8(AlO_2)_8(SiO_2)_{40} \cdot 24 H_2O$$

Mordenite has an ordered crystalline structure made up of chains of 5-membered rings of tetrahedra. In its sodium form the crystal is believed to have a system of parallel channels having free diameters of about 4.0 A. to about 4.5 A., interconnected by smaller channels, parallel to another axis, on the order of 2.8 A. free diameters. Advantageously, in certain ionic forms, e.g. acid exchanged, the mordenite crystal can have channels with effective free diameters of from about 6.5 A. to about 8.1 A. As a result of this crystalline framework, mordenite in proper ionic forms, sorbs benzene and other cyclic hydrocarbons.

It will be appreciated that other alumino-silicates can be employed as catalysts for the processes of this invention. A criterion for each catalyst is that its ordered internal structure must have defined pore sizes of sufficient diameters to allow entry of the preselected reactants and the formation of the desired reaction products. Furthermore, the alumino-silicate advantageously should have ordered internal structure capable of chemisorbing or ionically bonding additional metals and/or hydrogen ions within its pore structure so that its catalytic activity may be altered for a particular reaction. Among the naturally occurring crystalline alumino-silicates which can be employed are faujasite, heulandite, clinoptiolite, chabazite, gmelinite, mordenite and mordenite-like structures, and dachiardite.

The preferred alumino-silicate catalyst contemplated herein for production of ureas and thioureas is prepared from the alkali metal or alkaline earth metal forms of the alumino-silicates described herein. One of these catalysts is prepared from the sodium form of zeolite X, a synthetic faujasite having a pore size of about 13 A. This alumino-silicate is a commercially available zeolite designated as Linde 13X. In addition, other metals may be incorporated into the alumino-silicate to provide effective catalysts. This incorporation is effected by conventional methods, involving the partial or complete replacement of the alkali metal or alkaline earth metal by contact with a fluid medium containing cations of metals such as the rare earth metals.

Any medium which will effect ionization without affecting the ordered internal structure of the zeolite may be employed. After such treatment the resulting exchanged product is water washed, dried and dehydrated. The dehydration removes water from the pores of the alumino-silicate, thereby producing the characteristic system of open pores, passages, or cavities of alumino-silicates having an ordered internal structure.

As a result of the above treatment the metal exchanged alumino-silicate is an activated crystalline-like catalyst in which the molecular structure has been changed only by having metallic cations chemisorbed or ionically bonded thereto. It will be appreciated that in some instances, hydrogen sites may also be formed within the alumino-silicate by the hydrolysis of the metallic cations (e.g. the rare earth metals) in the manner heretofore described. Thus, it has been found that a rare earth exchanged zeolite X catalyst of this invention may contain from about 0.5 to about 1.0 milliequivalent of hydrogen per gram of solid catalyst. Furthermore, it will be appreciated that the defined pore size of the exchanged zeolite X may vary from above about 6 A., generally from about 6 A. to about 15 A., and preferably in the approximate range of about 10 A. to about 13 A. in diameter.

Advantageously, the rare earth cations can be provided from the salt of a single metal or preferable mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earths determined as oxides: lanthanum, 45–46% by weight; cerium, 1–2% by weight; praseodymium, 9–10% by weight; neodymium, 32–33% by weight; samarium, 5–6% by weight; gadolinium, 3–4% by weight; yttrium, 0.4% by weight; other rare earths 1–2% by weight. It is to be understood that other mixtures of rare earths are equally applicable in the instant invention.

Another active catalyst can be produced from zeolite X by base exchange of both rare earth cations and hydrogen ions to replace the sodium cations from the alumino-silicate. This base exchange may be accomplished by treatment with a fluid medium containing the rare earth salts followed by another containing hydrogen ions or cations capable of conversion to hydrogen ions. Inorganic and organic acids represent the source of hydrogen ions, whereas ammonium compounds are representative of the compounds containing cation capable of conversion to hydrogen ions. It will be appreciated that this fluid medium may contain a hydrogen ion, an ammonium cation, or mixture thereof, and a pH range from about 1 to about 12.

Other effective catalysts for the present process can be prepared from alumino-silicates such as zeolite Y and mordenite. Advantageously, the sodium form of zeolite Y alone may be employed as catalytic material. Also, exchange of rare earth metals for the sodium cations within zeolite Y produces a highly active catalyst in a manner similar to that described for preparation of the rare earth exchanged zeolite X. Preferably, because of its high acid stability, zeolite Y may be treated by partially replacing the sodium cations with hydrogen ions. This replacement may be accomplished by treatment with a fluid medium containing a hydrogen ion or a cation capable of conversion to a hydrogen ion (i.e., inorganic acids or ammonium compounds or mixture thereof).

Zeolite 5A also may serve as an effective catalyst. This zeolite material may be base exchanged with other divalent metal cations in a manner similar to that described for preparation of the metal exchanged faujasites; preferably, however, is used in its calicum form.

Mordenite may be activated to serve as a catalyst for the instant invention by replacement of the sodium cation with a hydrogen cation. The necessary treatment is essentially the same as that described above for the preparation of acid zeolite Y except that a mineral acid such as HCl is used as a source of hydrogen cations. In general, the mordenite is reduced to a fine powder (approximately passing a 200 mesh sieve and preferably passing 300 and 325 mesh sieves or finer) and then acid treated.

It will be appreciated that cations of metals other than the rare earths having mono- and polyvalences may be employed to replace the exchangeable cations from the alumino-silicates to provide effective catalysts for this invention. Exemplary of these metals are zinc, magnesium, tin, cobalt, nickel, silver, and the like. Moreover, other higher valence metals such as zirconium, titanium, vanadium, chromium, manganese, iron, and the like may also be employed. It will be understood that the chemical properties of the metal, i.e., its atomic radius, degree of ionization, hydrolysis constant, and the like, will determine its suitability for exchange with a particular alumino-silicate material. It will also be appreciated that certain divalent metals such as calcium, barium, and magnesium may be used with ammonium chloride or like ammonium compounds to produce active cation sites within the alumino-silicate catalyst by conventional base exchange techniques, the ammonium cations being decomposed to form hydrogen sites by heating the exchanged alumino-silicate to drive off ammonia.

The alumino-silicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline alumino-silicate. Such materials may be catalytically inert or may possess an intrinsic catalytic activity or an activity attributable to close association or reaction with the crystalline alumino-silicate. Such materials include by way of examples, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline alumino-silicates may be prepared by growing crystals of the alumino-silicate in the pores of the support. Also, the alumino-silicate may be intimately composited with a suitable binder, such as inorganic oxide hydrogel or clay, for example by ball milling the two materials together over an extended period of time, preferably in the presence of water, under conditions to reduce the particle size of the alumino-silicate to a weight mean particle diameter of less than 40 microns and preferably less than 15 microns. Also, the alumino-silicate may be combined with and distributed throughout a gel matrix by dispersing the alumino-silicate in powdered form in an inorganic oxide hydrosol. In accordance with this procedure, the finely divided alumino-silicate may be dispersed in an already prepared hydrosol, or, as is preferable, where the hydrosol is characterized by a short time of gelation, the finely divided alumino-silicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the alumino-silicate and then dried and calcined.

The inorganic oxide gel employed, as described above as a matrix for the metal alumino-silicate, may be a gel of any hydrous inorganic oxide, such as, for example, aluminous or siliceous gels. While alumina gel or silica gel may be utilized as a suitable matrix, it is preferred that the inorganic oxide gel employed by a cogel of silica and an oxide of at least one metal selected from the group consisting of metals of Groups IIA, IIB, and IVA of the Periodic Table. Such components include, for example, silica-alumina, silica-magnesia, silica-zirconia, silica-thoria, silica-beryllia, silica-titania as well as ternary combinations, such as, silica-alumina-thoria, silica-alumina-zirconia, silica-alumina-magnesia and silica-magnesia-zirconia. In the foregoing gels, silica is generally present as the major component and the other oxides of metals are present in minor proportion. Thus, the silica content of such gels is generally within the approximate range of about 55 to about 100 weight percent with the metal oxide content ranging from zero to 45 weight percent. The inorganic oxide hydrogels utilized herein and hydrogels obtained therefrom may be prepared by any method well-known in the art, such as, for example, hydrolysis of ethyl orthosilicate, acidification of an alkali metal silicate and a sale of a metal, the oxide of which it is desired to cogel with silica, etc. The relative proportions of finely divided cyrstalline alumino-silicate and inorganic oxide gel matrix may vary widely with the crystalline alumino-silicate content ranging from about 2 to 90 percent by weight and more usually, particularly where the composite is prepared in the form of beads, in the range of about 5 to about 50 percent by weight of the composite.

The catalyst of alumino-silicate employed in the process of this invention may be used in the form of small fragments of a size best suited for operation under the specific conditions existing. Thus, the catalyst may be in the form of a finely divided powder or may be in the form of pellets of about 1/16" to about 1/8" in diameter, obtained upon pelleting the alumino-silicate with a suitable binder, such as clay. The zeolite X, described hereinabove, may be obtained on a clay-free basis or in the form of pellets in which clay is present as a binder.

The process of this invention is conveniently carried out over a wide range of temperatures and pressures. Thus, depending on the particular catalyst employed and the nature of the reactants, the temperatures used may range from about 150° to about 950° F. Preferably, temperatures between about 200° and about 750° are used.

In general, temperatures at the lower range, e.g., about 150° to about 400° F., are preferred for producing urea, thiourea and mono-substituted alkyl amine derivatives, when a solvent is used to provide a liquid phase. It will be appreciated, however, that at the lower temperatures extended contact times may be required for effecting conversion of the less reactive amines.

In addition, it will be apparent that the choice of reaction temperatures is also affected by other operating conditions. Thus, in certain reactions, temperatures of above 950° F. may be utilized with higher pressures to produce improved yields of the ureas contemplated by the process of this invention.

The pressures utilized by the present process may extend from about atmospheric to pressures of several hundred atmospheres. Often higher pressures (e.g., from about 200 to about 2000 p.s.i.g.), may be. effective for promoting improved yields from the less reactive amines at higher temperatures by reducing the occurrence of polymerization, degradation and other undesirable side reactions. It is believed that at higher pressures, liquid phase operation facilitates transfer of the reactants and products through the catalyst by washing out or otherwise preventing accumulation of the coke-like deposits. It will be appreciated that these higher pressures may be obtained, in some cases, by mixing inert carrier gases, such as, nitrogen, helium, or the like, with the reactants.

The amount of catalyst used to effect the reactions of this invention may vary considerably depending on whether the reactions are conducted as a batch-type operation, or a continuous, or a semi-continuous process. In general, with batch-type operation, it has been found that the amount of catalyst may extend from about 0.1 percent by weight to about 10.0 percent by weight of the charged ammonia or amine. In continuous or semi-continuous processes in which one or more reactor vessels are employed with cyclic regeneration of the catalyst, the amount of catalyst as measured in terms of the hourly space velocities of the ammonia or amine reactants, may range from about 0.25 to about 10.0. It will be understood that the catalyst of this invention may be readily regenerated during such cyclic continuous processes or after their use in a batch-type operation by burning the contaminants off in an air stream at temperatures of about 1000° F., from about 1 to about 3 hours.

The molar ratio of reactants used in accordance with this invention may be varied substantially without affecting the present process. In general, the reactants are used in about stoichiometric proportions, e.g., the molar ratio between ammonia and carbon dioxide being about 2:1. Often, excessive quantities of any of the reactants may be used.

Although the process of this invention may be conveniently carried out in the absence of a solvent reaction medium, a solvent may be employed in some cases. Among the solvents which may be used are alcohols, such as, methanol, ethyl, alcohol, isopropyl alcohol, and the like; aromatic hydrocarbons, such as, benzene, toluene, and the like; halogenated hydrocarbons, such as, carbon tetrachloride, and the like, and certain ethers and glycols.

It will be appreciated that the operating conditions employed by the present invention usually will be dependent upon the specific reaction to be effected. Such conditions as temperature, pressure, space velocities of the reactants, presence of solvent medium, or an inert carrier gas, and the like, will have important effects on the process. Accordingly, the manner in which these conditions affect the process of this invention may be more readily understood by reference to the following specific examples.

The following runs were carried out continuously in a tubular glass reactor containing a fixed bed of an alumino-silicate catalyst. The reactor was divided into an upper preheater section containing a bed of quartz chips and a lower catalyst section. Each of the sections were wrapped with a resistance wire and insulated with asbestos tape and aluminum foil for providing heat to the quartz chips and to the catalyst. A variable transformer was used to regulate these heat inputs and thermocouples were inserted into each section to indicate the temperature of the quartz chips and the catalyst.

The bottom of the reactor was connected to a water cooled condenser and a product receiver which served to remove the higher boiling point components from the product stream. A tubular connection was attached to the receiver to allow the non-condensable products to pass out through a gas meter for measuring the rate of gas discharge.

The reactants were introduced into the upper portion of the reactor above the preheater section and forced downwardly through the preheater section and through the catalyst bed. A syringe pump was employed to inject the liquid reactants while the gaseous reactants were metered from the lecture bottles.

Operation of the unit was as follows: The catalyst was initially raised to the reaction temperature and then the reactants were passed downwardly through the quartz chips and over the alumino-silicate catalyst for extended periods of continuous operation. The product stream was removed through the condenser and a liquid condensate was collected in the product receiver. After a short period, crystals were formed in the condensate and in the tubular connection for discharging gas from the receiver. The crystals were recovered by decantation of the condensate and by washing the tubular connection with methanol. After the methanol was evaporated off the crystals were collected and analyzed by infrared spectrum techniques, or melting point depression tests.

One of the catalysts employed during these runs was a 13X zeolite (sodium form of the faujasite zeolite X having a pore size of 13A.). Another catalyst was prepared by exchanging the 13X zeolite with cations of the rare earth metals, followed by washing, drying and calcining in a manner heretofore described. This exchanged material was then incorporated within an inert matrix binder consisting of a silica-alumina gel on a 50 percent by weight basis. Also, a calcium exchanged 13X zeolite was used as a catalyst.

*Example I*

Twelve grams of a 13X alumino-silicate catalyst was placed in a glass tubular reactor and heated to a temperature of about 575° F. Then liquid aniline was introduced into the top of the reactor through a preheater section at about 250° F., at a rate of 7 cc. per hour and gaseous carbonyl sulfide was charged at the rate of 86 cc. per minute. A liquid condensate was collected and recovered from the bottom of the reactor. After several minutes, white crystals deposited from the condensate (which consisted primarily of aniline). The unreacted aniline was decanted from the crystals and the crystals were washed with pentane, followed by methanol and were then dried. Infrared absorption spectrum analysis of these crystals showed that the crystals contained N,N'-diphenylurea and N,N'-diphenylthiourea in about 1:1 molar proportions.

*Example II*

Following the same procedure and using the same flow rates as described in Example I, 12 grams of 13X zeolite catalysts were contacted with liquid aniline and gaseous carbonyl sulfide for several minutes at temperatures of about 700° F. The gaseous effluent was condensed and a liquid product was recovered. On removal of unreacted aniline from this product, white crystals remained which were identified by infrared absorption spectrum data as a mixture of approximately 1:1 molar ratio of N,N'-diphenylurea and N,N'-diphenylthiourea.

*Example III*

Fifty grams of a 13X zeolite catalyst were placed in a tubular reactor and heated to a temperature of about 700° F. Then 24 grams of carbonyl sulfide at a rate of 37.5 gaseous cc. per minute and 6.0 grams of ammonia at a rate of 165 cc. per minute, were passed continuously through the reactor for two hours. A product of white crystals was collected in the tubing and the product receiver of the reactor. The tubing and receiver were washed out with methanol and then the methanol evaporated off to recrystallize the product. These crystals were identified by melting point depression as being urea (about 271° F.).

*Example IV*

Using the same 13X zeolite catalyst employed in Example III, 60 grams of the catalyst were raised to a temperature of about 735° F. Then 8 grams of ammonia at a rate of 165 cc. per minute, together with 17 grams of hydrogen sulfide at a rate of 87.5 cc. per minute and 10 grams of carbon monoxide at a rate of 87.5 cc. per minute, were passed into the reactor and over the catalyst. A gaseous effluent was continuously condensed and collected in the product receiver with the subsequent formation of white crystals in the tubing of the gas outlet and in the receiver. The collected crystals were washed from the tubing and receiver with methanol, and the methanol subsequently evaporated off and the recrystallized product collected. These crystals were checked by melting point depression to be urea (about 271° F.).

*Example V*

A tubular reactor containing 20 grams of a composite catalyst made of about 50 percent by weight of rare earth exchanged 13X zeolite, and about 50 percent by weight of silica-alumina gel, was heated to raise the temperature of the catalyst to about 400° F. (The preheater section being heated to about 350° F.) Then 40 cc. per minute of carbon dioxide and 80 cc. per minute of ethylamine were passed into the preheater section of quartz chips and downwardly through the catalyst. After about 600 minutes, 60 grams of a crystalline product were collected. A melting point determination indicated that the product was N,N'-diethylurea.

*Example VI*

A mixture of 76 grams of carbon disulfide and 186 grams of aniline were passed over 20 grams of a catalyst of calcium exchanged 13X zeolite at a temperature of about 400° F. over a period of one hour. A liquid condensate was collected from which crystals deposited. Analysis of the crystals by infrared spectrum absorption identified them as N,N'-diphenylurea and N,N'-diphenylthiourea.

*Example VII*

A mixture of 76 grams of carbon disulfide and 256 grams of P-chloroaniline were passed over 20 cc. of a catalyst of rare earth exchanged 13X zeolite at a temperature of about 400° F. over a three hour period. One hundred forty grams of a liquid condensate were collected, from which crystals were deposited and recovered. Analysis of the crystals by infrared spectrum absorption identified them as a mixture of N,N'-bis (p-chlorophenyl) urea and N,N'-bis (p-chlorophenyl) thiourea.

*Example VIII*

Seventy-six grams of carbon disulfide and 60 grams of ammonia were passed over a catalyst of calcium exchanged 13X zeolite at a temperature of about 400° F. A liquid condensate was collected, from which 38 grams of crystals were deposited and recovered. Analysis of the crystals by infrared spectrum absorption identified them as a mixture of urea and thiourea. In addition, hydrogen sulfide was evolved and passed from the reactor.

Examination of the above examples shows that urea, thiourea, and substituted derivatives thereof, can be readily produced by the process of this invention and that alumino-silicate catalysts exhibit extended periods of unique activity over a wide range of operating conditions.

It will be appreciated that the amines enumerated in the above examples and in the specification are merely illustrative of the different reactants which can be employed by the process of this invention and that other amines are contemplated by this invention as possible reactants.

It will be further appreciated that alumino-silicate catalysts other than those specifically employed in the examples, also may be used in the present process, that various modifications and alternations may be made in this process without departing from the spirit of the invention, and that the scope of the invention is limited only by the appended claims.

What is claimed is:

1. A process for producing ureas, thioureas and substituted derivatives thereof which comprises effecting reaction of a nitrogen compound having the general formula:

wherein R and $R_1$ represent substituents selected from the groups consisting of hydrogen, and alkyl radicals, aryl radicals, cycloalkyl radicals and substituted derivatives thereof and a compound selected from the group consisting of carbon dioxide, carbon disulfide and carbonyl sulfide in the presence of a catalyst comprising a crystalline alumino-silicate which contains active cation sites within an ordered internal structure.

2. The process of claim 1 in which the substituted derivatives are formed by radicals selected from the group consisting of alkoxy, carboxy, halo, and cyano groups.

3. The process of claim 1 in which the nitrogen compound includes ammonia, and primary and secondary amines.

4. The process of claim 1 in which the alumino-silicate catalyst has a pore size of at least 5 A. in diameter.

5. The process of claim 1 in which the alumino-silicate catalyst has a silicon to aluminum ratio of at least about 1.8 within an ordered internal structure.

6. The process of claim 1 in which the alumino-silicate catalyst contains cations selected from the group consisting of exchangeable metals, ammonium, hydrogen, and mixtures thereof.

7. The process of claim 1 in which the alumino-silicate catalyst contains cations of the rare earth metals.

8. The process of claim 1 in which the alumino-silicate catalyst contains cations selected from the group consisting of the alkali metals and the alkaline earth metals.

9. The process of claim 1 in which the alumino-silicate catalyst is selected from the group consisting of faujasite and homologs thereof.

10. The process of claim 1 in which the alumino-silicate catalyst is a sodium form of faujasite.

11. The process of claim 1 in which the alumino-silicate catalyst is a composite catalyst of a rare earth-exchanged faujasite and a silica-alumina gel.

12. The process of claim 1 in which the alumino-silicate catalyst is a rare earth-exchanged faujasite.

13. The process of claim 1 in which the alumino-silicate catalyst is a calcium exchanged faujasite.

14. The process of claim 1 in which the alumino-silicate catalyst is contained in and distributed throughout a matrix binder.

15. The process of claim 1 in which said reaction is conducted at temperatures from about 150° to about 950° F.

16. The process of claim 1 in which said reaction is conducted from about atmospheric to superatmospheric pressures.

17. A process for producing N,N'-diphenylurea and N,N'-diphenylthiourea which comprises effecting reaction of aniline and carbonyl sulfide in the presence of an alkali metal form of faujasite at a temperature of from about 400° to about 750° F. and recovering a product containing a mixture of N,N'-diphenylurea and N,N'-diphenylthiourea.

18. A process for producing a mixture of urea and thiourea which comprises effecting reaction of ammonia and carbonyl sulfide in the presence of an alkali metal form of faujasite at a temperature of from about 300° to about 800° F. and recovering a product of thiourea and urea.

19. A process for producing N,N'-diethylurea which comprises effecting reaction of ethylamine and carbon dioxide in the presence of a composite catalyst of a rare earth exchanged faujasite and a silica-alumina gel at a temperature of from about 250° to about 400° F. and recovering a product of N,N'-diethylurea.

20. A process for producing N,N'-diphenylthiourea which comprises effecting reaction of aniline and carbon disulfide in the presence of a calcium exchanged faujasite at a temperature of from about 250° to about 500° F. and recovering a product of N,N'-diphenylthiourea.

21. A process for producing N,N'-bis (p-chlorophenylthiourea) which comprises effecting reaction of p-chloroaniline and carbon disulfide in the presence of a rare earth exchanged faujasite at a temperature of from about 200° to about 500° F. and recovering a product of N,N'-bis (p-chlorophenylthiourea).

22. A process for producing thiourea which comprises effecting reaction of ammonia and carbon disulfide in the presence of a calcium exchanged faujasite at a temperature from about 250° to about 600° F. and recovering a product of thiourea.

No references cited.

ALEX MAZEL, *Primary Examiner.*

HENRY R. JILES, *Examiner.*